(12) United States Patent
Wilkerson et al.

(10) Patent No.: US 10,752,377 B2
(45) Date of Patent: Aug. 25, 2020

(54) METHOD AND APPARATUS FOR PREVENTING LIGHTNING STRIKE DAMAGE TO A STRUCTURAL COMPONENT

(71) Applicant: The Boeing Company, Chicago, IL (US)

(72) Inventors: Jeffrey A. Wilkerson, Bothell, WA (US); Tanni Sisco, Mukilteo, WA (US); Paul E. Ffield, Marysville, WA (US)

(73) Assignee: The Boeing Company, Chicago, IL (US)

( * ) Notice: Subject to any disclaimer, the term of this patent is extended or adjusted under 35 U.S.C. 154(b) by 835 days.

(21) Appl. No.: 15/368,678

(22) Filed: Dec. 5, 2016

(65) Prior Publication Data
US 2017/0137146 A1    May 18, 2017

Related U.S. Application Data

(60) Division of application No. 14/171,782, filed on Feb. 4, 2014, now Pat. No. 9,533,771, which is a (Continued)

(51) Int. Cl.
*B64D 45/02* (2006.01)

(52) U.S. Cl.
CPC ......... *B64D 45/02* (2013.01); *Y10T 29/49622* (2015.01); *Y10T 29/49947* (2015.01); *Y10T 29/49963* (2015.01)

(58) Field of Classification Search
CPC ... A61K 31/4164; B64D 45/02; G01J 1/0407; G01J 1/0418; G01J 1/26; G01J 1/429; G02B 1/06; G02B 26/023; G02B 5/205; G03F 7/70008; G03F 7/70033; G03F 7/7055; G03F 7/70558; G03F 7/7085; G21K 1/10; H01S 3/005; H01S 3/0085;
(Continued)

(56) References Cited

U.S. PATENT DOCUMENTS 2,278,054 A    3/1942    Berg
3,918,165 A    11/1975   Czernik et al.
(Continued)

OTHER PUBLICATIONS

"Bushings", ForceMate Aerospace Bushing Installation—Fatigue Technology, Inc., copyright 2006, accessed Jun. 29, 2006, 4 pages. http://www.fatiguetech.com/bushings_forcemate.html.
(Continued)

*Primary Examiner* — Thienvu V Tran
*Assistant Examiner* — Nicolas Bellido
(74) *Attorney, Agent, or Firm* — Yee & Associates, P.C.

(57) ABSTRACT

A method and apparatus for preventing damage to a metal component that is susceptible to damage by electro-magnetic effects or reduce manufacturing assembly steps. An initial channel is formed through the metal component and is defined by an inner surface. A bushing is placed into the initial channel. An interference fit is created between the outer surface of the bushing and the inner surface of the initial channel through the metal component. A final channel is formed through the bushing. A fastener is placed into the final channel to attach the metal component to a second component, wherein electrical magnetic effects occur between the fastener and the bushing.

21 Claims, 4 Drawing Sheets

Related U.S. Application Data continuation of application No. 11/468,174, filed on Aug. 29, 2006, now Pat. No. 8,661,683.

(58) Field of Classification Search
CPC ... H01S 3/0903; H05H 7/04; Y10T 29/49622; Y10T 29/49947; Y10T 29/49963
See application file for complete search history.

(56) References Cited

U.S. PATENT DOCUMENTS

| | | | |
|---|---|---|---|
| 3,953,906 A | | 5/1976 | Brown |
| 3,989,984 A | * | 11/1976 | Amason ................ B29C 70/885 361/212 |
| 4,502,092 A | | 2/1985 | Bannick, Jr. et al. |
| 4,755,904 A | | 7/1988 | Brick |
| 5,129,253 A | * | 7/1992 | Austin ................... B23P 9/025 29/426.4 |
| 5,178,502 A | * | 1/1993 | Sadri ................... F16B 19/1063 411/361 |
| 5,689,873 A | | 11/1997 | Luhm |
| 8,661,683 B2 | | 3/2014 | Wilkerson et al. |
| 9,533,771 B2 | | 1/2017 | Wilkerson et al. |
| 2005/0262682 A1 | * | 12/2005 | Grover ................... B23P 9/025 29/428 |
| 2007/0041143 A1 | * | 2/2007 | Georgeson ............. B64D 45/02 361/220 |
| 2008/0078864 A1 | | 4/2008 | Wilkerson et al. |
| 2015/0298820 A1 | | 10/2015 | Wilkerson et al. |

OTHER PUBLICATIONS

"Bushings", Gromex Composite Aerospace Grommet Installation Fatigue Technology, Inc., accessed Jun. 29, 2006, 3 pages. http://www.fatiguetech.com/bushings_gromex.html.

Office Action, dated Jun. 1, 2010, regarding U.S. Appl. No. 11/486,174, 16 pages.

Final Office Action, dated Sep. 22, 2010, regarding U.S. Appl. No. 11/486,174, 11 pages.

Notice of Allowance, dated Oct. 17, 2013, regarding U.S. Appl. No. 11/486,174, 10 pages.

Notice of Allowance, dated Aug. 23, 2016, regarding U.S. Appl. No. 14/171,782, 14 pages.

* cited by examiner

METHOD AND APPARATUS FOR PREVENTING LIGHTNING STRIKE DAMAGE TO A STRUCTURAL COMPONENT

This application is a divisional application of U.S. patent application Ser. No. 14/171,782, filed Feb. 4, 2014, now U.S. Pat. No. 9,533,771, which is a continuation of U.S. patent application Ser. No. 11/468,174, filed Aug. 29, 2006, now U.S. Pat. No. 8,661,683.

BACKGROUND OF THE INVENTION

1. Field of the Invention

The present invention relates generally to airplanes and more particularly to reducing electro-magnetic effects to structural components in an airplane in addition to reducing the number of steps needed to assemble components.

2. Description of the Related Art

Lightning strikes occasionally occur on an aircraft traveling near or through a thunderstorm. A lightning strike on an aircraft normally does not damage the aircraft, but may leave a burn mark. Additionally, pits or burns on the skin of the aircraft occur at points of entry or exit for the lightning strike. In particular, an electric strike arcing may occur between a fastener and a hole bore in a structure in which fasteners are used to hold different structural components of the aircraft together. The arcing may induce a defect on the surface, which induces a stress concentration. This defect is also referred to as "pitting". Various parts of the aircraft may be more sensitive to this type of defect than others. For example, the side-of-body chord used to attach a wing to the aircraft is often made of titanium. Holes are formed in the side-of-body chord to receive fasteners to attach the wing. This type of metal is very notch sensitive.

As a result, pitting on a hole surface in a chord made of titanium greatly reduces the fatigue resistance of this part. This component and other components for the side body joint are part of a safety of flight joint and cannot have these types of defects.

One current approach to reduce electro-magnetic effects (EMEs), such as those from lightning strikes, is to use interference fit fasteners. However, with the currently used assembly processes, interference fit fasteners are hard to use because of space constraints present when installing the fasteners while attaching a wing to a body of an aircraft. Redesigning the joint is expensive and not feasible.

Current assembly processes employ "One-Up Assembly" in which once parts are put together, the different parts are not taken apart again. The complexity with the number of different fasteners makes it almost impossible to correctly realign parts if parts have to be removed once they have been put together in the assembly process. For this reason, "One-Up Assembly" is often used. For example, in attaching a wing to a body of an aircraft, several thousand fasteners may be required to attach the wing to the body. Realigning this number of holes for fasteners is very time consuming if the parts are taken apart after holes are created for fasteners to remove defects that occur from creating the holes for the fasteners. In most cases realignment is impossible if disassembly occurs.

Therefore, it would be advantageous to have an improved method and apparatus for assembling components.

SUMMARY OF THE INVENTION

An embodiment of the present invention provides a method and apparatus for preventing damage to a metal component that is susceptible to damage by electro-magnetic effects. An initial channel is formed through the metal component. The initial channel is defined by an inner surface. A bushing is placed into the initial channel, wherein the bushing has an outer surface and an inner channel. An interference fit is created between the outer surface of the bushing and the inner surface of the initial channel through the metal component. A final channel is formed through the bushing. In forming the final channel, material is removed from the bushing to increase a size of the inner channel to one that is suitable to receive a fastener and such that the inner surface of the metal component remains unexposed within the final channel. The final channel extends through a second component. A fastener is placed into the final channel to attach the metal component to a second component, wherein electro-magnetic effects occur between the fastener and the bushing.

The features, functions, and advantages can be achieved independently in various embodiments of the present invention or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION OF THE PREFERRED EMBODIMENT

Figure 1:
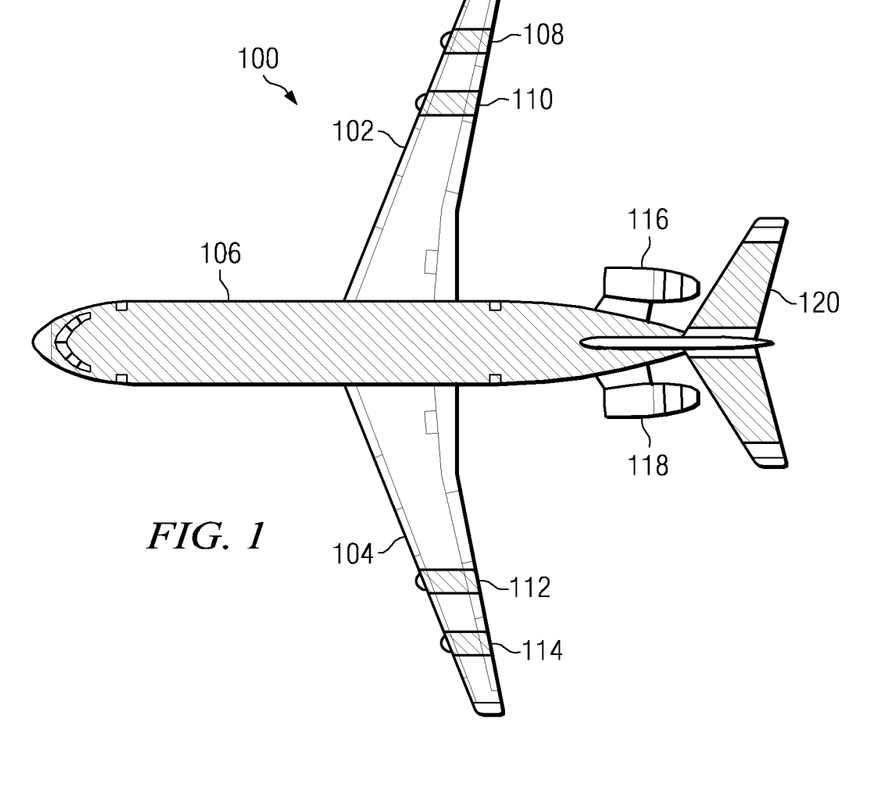
FIG. 1 is a diagram of an aircraft in which an advantageous embodiment the present invention may be implemented.

With reference now to the figures, and in particular, with reference to FIG. 1, a diagram of an aircraft is depicted in which an advantageous embodiment of the present invention may be implemented. Aircraft 100 is an example of an aircraft in which a method and apparatus for preventing lightning strike damage to a structural component may be implemented. Further, aircraft 100 also illustrates an example of an aircraft in which the number of steps needed to fasten the structural components together is reduced.

In this illustrative example, aircraft 100 has wings 102 and 104 attached to body 106. The attachment of wing 102 and wing 104 to body 106 are examples of structures in which protection from electro-magnetic effects, such as lightning strikes, is crucial to maintain fatigue resistance. Typically, body 106 has a side-of-body chord (not shown) that is made of titanium and used to join wing 102 and wing 104 to body 106. In this depicted example, these wings have carbon fiber reinforced polymer (CFRP) within the structural components. Aircraft 100 includes wing mounted engines 108, 110, 112 and 114. Further, aircraft 100 also includes body mounted engine 116 body mounted engine 118 and tail 120.

Figure 2:
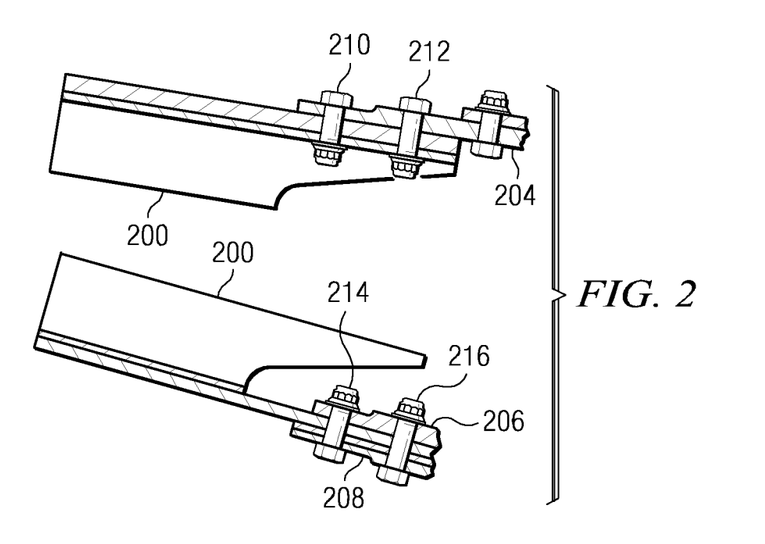
FIG. 2 is a diagram illustrating structural components used to affix a wing to a body of an aircraft in accordance with an advantageous embodiment of the present invention.

Turning now to FIG. 2, a diagram illustrating structural components used to affix a wing to a body of an aircraft is depicted in accordance with an advantageous embodiment of the present invention. In this example, these structural components show the point at which a wing, such as wing 102 in FIG. 1, is affixed to a body of an aircraft, such as body 106 in FIG. 1.

In this illustrative example, wing 200 is affixed to a wing box for the body of the aircraft using chord 204, chord 206, and splice plate 208. In these examples, fasteners, such as bolts 210, 212, 214, and 216 are assembled using bushings in accordance with an advantageous embodiment of the present invention. Assembly of fasteners, such as bolts, is described in more detail below.

The present invention provides a method and apparatus for preventing damage to a metal component that is susceptible to damage by electro-magnetic effects. In these illustrative examples, the electro-magnetic effect is one caused by a lightning strike on an aircraft. In attaching components to each other, an initial channel is formed through a metal component. This metal component has an inner surface. A bushing is placed into this initial channel. The bushing is expanded to form an interference fit between the outer surface of the bushing and the inner surface of the channel formed in the metal component. A final channel is formed through the bushing and the second component in which material is removed from the bushing to increase the size of the inner channel.

This increased size of the inner or final channel is suitable to receive a fastener. Further, the inner surface of the metal component remains unexposed within the final channel. The fastener is placed into the final channel to attach the metal component to the second component. As a result, in the event that an electro-magnetic effect occurs, the electro-magnetic effect occurs between the fastener and the bushing instead of between the fastener and the metal component. Further, the metal component may be placed into position for attachment to the second component prior to forming the final channel. This step is an illustrative example of one that helps facilitate "One-Up Assembly".

Figure 3:
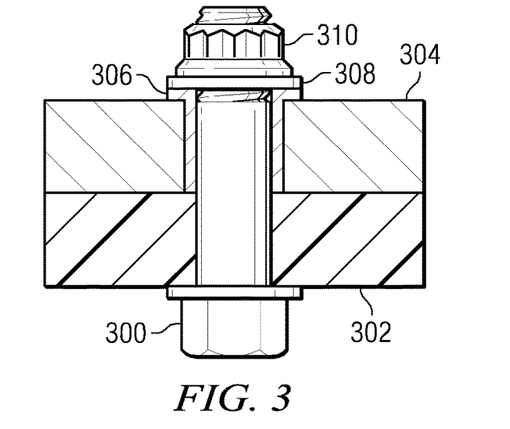
FIG. 3 is a cross-sectional diagram illustrating a fastener in accordance with an advantageous embodiment of the present invention.

Turning now to FIG. 3, a cross-sectional diagram illustrating a fastener is depicted in accordance with an advantageous embodiment of the present invention. In this example, the fastener takes the form of bolt 300. Bolt 300 is an example of a bolt, such as bolt 210 in FIG. 2. As can be seen in this example, carbon fiber reinforced polymer (CFRP) section 302 and titanium section 304 are two different components that are joined together.

As depicted, bushing 306 forms a barrier between bolt 300 and titanium section 304. In this illustrative example, bushing 306 provides a sacrificial material in the event of an electro-magnetic effect, such as a lightning strike. Any arcing that may occur from a lightning strike occurs between bolt 300 and bushing 306 in these illustrative examples. In this manner, any damage or pitting, that may occur, occurs in bushing 306, rather than in titanium section 304.

Bolt 300 is secured using washer 308 and nut 310. As used herein, a bushing is a cylindrical shell with or without a flange that may be installed in a structural component in conjunction with a member or fastener, such as a pin or a bolt. In other words, a bushing is a member that is cylindrical in shape and has a channel through it. The outside surface of this member has an outer diameter and the channel has an inner diameter. A bushing is also referred to as a plain journal bearing or a sleeve bearing in these examples.

Bushings are typically used for components that move or turn. In the illustrative examples, however, these bushings are used as a sacrificial material for placing fasteners, such as bolts, into materials that are susceptible to damage from electro-magnetic effects. One example of this type of material is titanium. Other examples of materials that may be used include aluminum and steel alloys. Arcing will reduce the fatigue life of any metal component.

Figure 4:
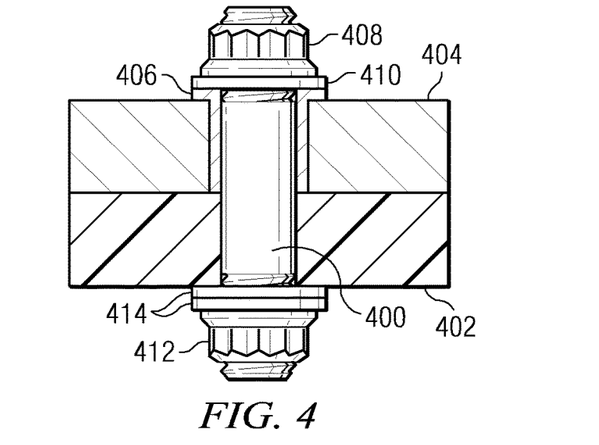
FIG. 4 is a cross-sectional diagram of a fastener in the form of a titanium stud in accordance with an advantageous embodiment of the present invention.

Turning now to FIG. 4, a cross-sectional fastener in the form of a titanium stud is depicted in accordance with an advantageous embodiment of the present invention. In this example, titanium stud 400 holds together carbon fiber reinforced polymer section 402 and titanium section 404. Titanium stud 400 is surrounded by bushing 406 within titanium section 404. Titanium stud 400 is held in place using nut 408, washer 410, nut 412, and washer 414. Titanium stud 400 is an alternative example of a fastener that may be used in accordance with an advantageous embodiment of the present invention. The fasteners shown in the examples in FIGS. 3 and 4 are presented for purposes of illustration and are not intended to limit the type of fastener that may be used in the different embodiments of the present invention.

Figure 5A:
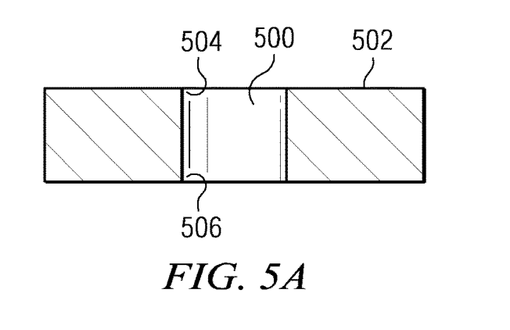
FIGS. 5A-5C are cross-sectional diagrams illustrating the installation of a bushing within a titanium section in accordance with an advantageous embodiment of the present invention.
Figure 5B:
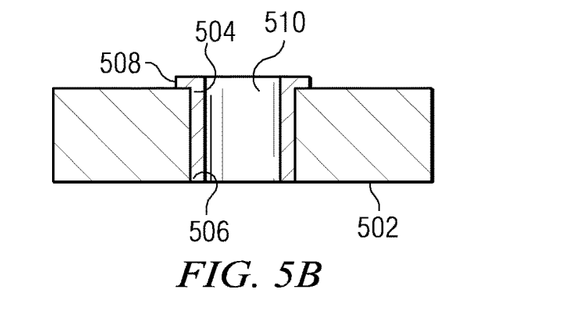
Figure 5C:
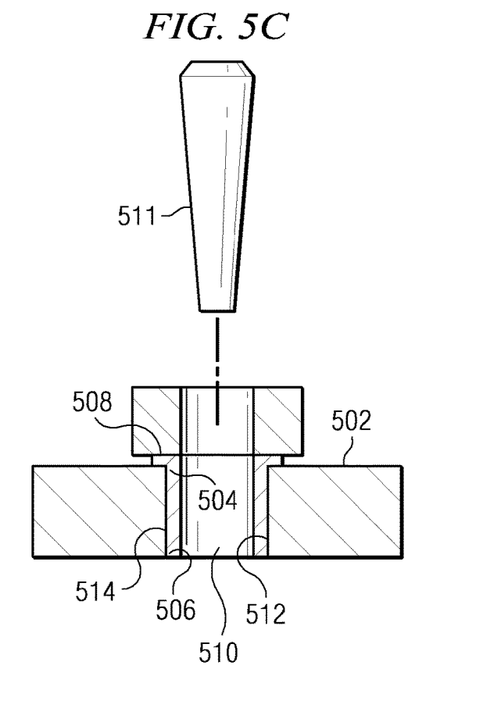

Turning now to FIGS. 5A-5C, cross-sectional diagrams illustrating the installation of a bushing within a titanium section are depicted in accordance with an advantageous embodiment of the present invention.

In FIG. 5A, hole 500 is formed in titanium section 502. Hole 500 is created through a drilling process in these examples. This hole is a first channel in titanium section 502. One result of the drilling process is that burrs are present both in entry 504 and exit 506 of hole 500 in titanium section 502. In this illustrative example, de-burring is then performed on titanium section 502 to remove these defects. These defects are removed to avoid fatigue penalties in metal materials, such as titanium. Thereafter, in FIG. 5B, bushing 508 is installed into hole 500 in titanium section 502. Bushing 508 contains hole 510, which forms a second channel. This hole is one through which a fastener may be placed.

In FIG. 5C, mandrel 511 is pulled through bushing 508 to expand bushing 508 such that it remains in place in titanium section 502. The interference fit is between outer surface 512 of bushing 508 and inner surface 514 of hole 500 in titanium section 502. An example of a process that may be used to generate an interference fit for a bushing is Forcemate available from Fatigue Technology, Inc. Of course, an interference fit may be accomplished using other tools or processes. For example, currently available shrink or press fit processes may be used to create the interference fit.

Figure 6A:
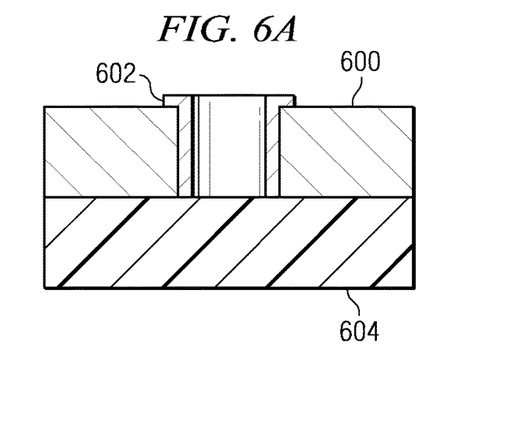
FIGS. 6A-6B are cross-sectional diagrams illustrating fastening two structural components together in accordance with an advantageous embodiment of the present invention.
Figure 6B:
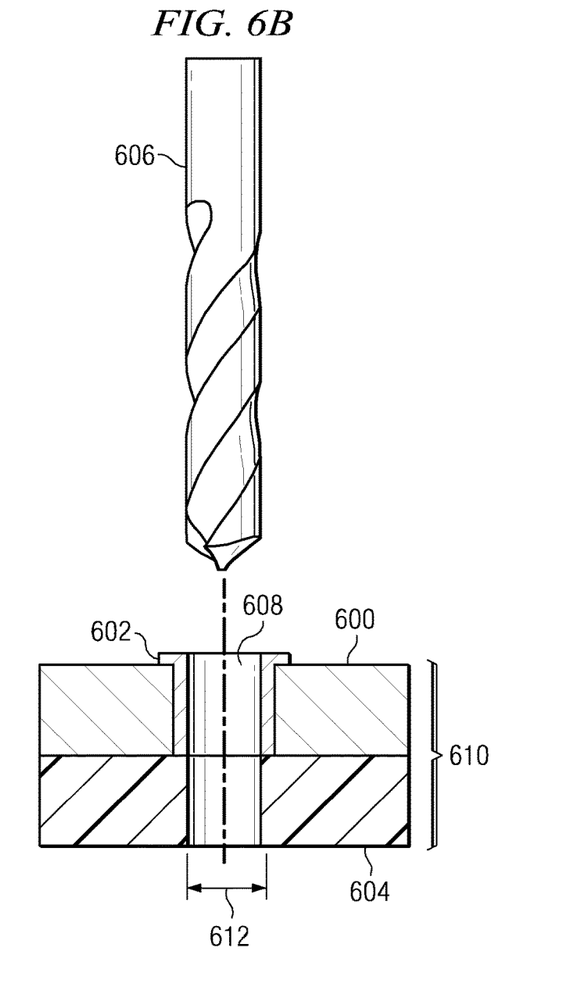

Turning now to FIGS. 6A-6B, cross-sectional diagrams illustrating the fastening of two components together are depicted in accordance with an advantageous embodiment of the present invention. In these illustrative examples, the components are structural components. In this example in FIG. 6A, titanium section 600 contains bushing 602 and is similar to the final titanium section, titanium section 502, depicted in FIG. 5C.

In FIG. 6A, carbon fiber reinforced polymer (CFRP) section 604 is brought into place with titanium section 600. Thereafter in FIG. 6B, drill 606 is used to form hole 608 in CFRB section 604. Hole 608 has been drilled or bored to increase its size to form a final channel for final attachment. Bushing 602 serves as a guide for drill 606 in creating hole 608. These two sections form stack 610.

In creating hole 608, a burr present in inner diameter 612 of bushing 602. This burr is caused by reaming performed to increase a size of the diameter of hole 608 to inner diameter 612. However, a burr is not present within titanium section 600. This burr does not have to be removed because the burr is in bushing 602, not in titanium section 600.

As a result, fatigue penalties are not incurred in this process. Further, this type of process also allows for "One-Up Assembly". "One-Up Assembly" is a process in which the structure is not separated after it has been put together. In other words, stack 610 does not need to be disassembled to de-burr or remove the burr created within bushing 602. Stack 610 is left as is after the drilling occurs.

Consequently, an extra step in which disassembly of the components and cleaning or de-burring is avoided by using the processes in an advantageous embodiment of the present invention. This final reaming or drilling within hole 608 forms the final channel through bushing 602. The fastener is placed into this final channel formed within hole 608. The point of origin for a diameter of the final channel created through the bushing does not have to follow the point of origin for the diameter of the original hole created by the bushing as long as the component that is to be protected is not exposed. The thickness in the wall of the bushing varies depending on the particular requirements and implementations.

Although the depicted examples are shown in which the final channel for a fastener is created after the components have been brought together and aligned, the different advantageous embodiments of the present invention may be applied to components in which the final channel is generated separately for the components. In this type of implementation, the components are aligned after the formation of the final channel. Although additional steps may occur with this type of implementation, the bushing still serves to protect the material for the component for which damage from electro-magnetic effects is to be avoided.

Figure 7:
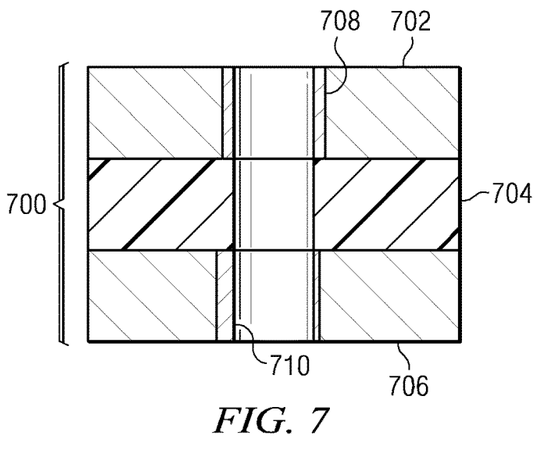
FIG. 7 is a cross-sectional diagram illustrating bushing offset capability in accordance with an advantageous embodiment of the present invention.

Turning now to FIG. 7, a cross-sectional diagram illustrating bushing offset capability is depicted in accordance with an advantageous embodiment of the present invention. In this example, stack 700 includes titanium section 702, carbon fiber reinforced polymer (CFRP) section 704 and titanium section 706. In this example, titanium section 702 contains bushing 708 and titanium section 706 contains bushing 710.

As depicted, the walls of bushing 708 have an even thickness throughout, while the walls of bushing 710 have an uneven thickness. These differences between the thickness of the walls in bushings 708 and 710 provide for increased part alignment tolerance. The thickness of a wall in a bushing may be less in some places than others as long as the thickness is sufficient to prevent electro-magnetic damage from occurring in the particular titanium section.

Figure 8:
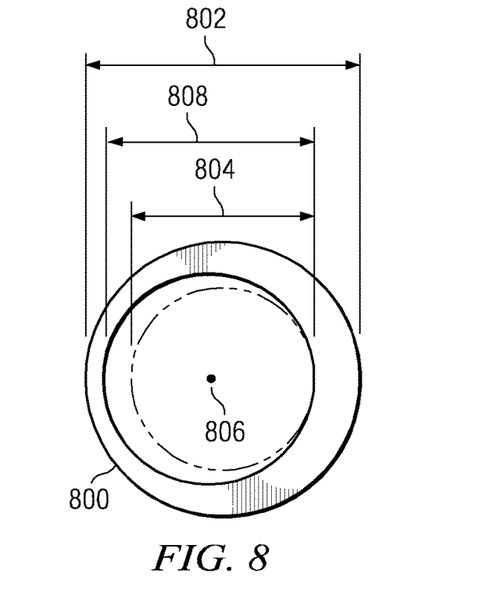
FIG. 8 is a diagram illustrating offsets in the positioning of a diameter in a hole within a bushing in accordance with an advantageous embodiment of the present invention.

With reference now to FIG. 8, a diagram illustrating offsets in the positioning of a diameter in a hole within a bushing is depicted in accordance with an advantageous embodiment of the present invention. This diagram illustrates a cross-section of a bushing in this example. Bushing 800 has outside diameter 802 and original inside diameter 804. Center point 806 is the point of origin for outside diameter 802 and original inside diameter 804. Final inside diameter 808 may have a different point of origin that is offset from center point 806 in this illustrative example. As can be seen, final inside diameter 808 for the final channel in which a fastener is placed does not have a point of origin along center point 806. This offset occurs to allow for part alignment tolerances to increase between the different parts being put together in a stack, such as stack 700 in FIG. 7.

Other offsets for the point of origin from center point 806 may occur depending on the particular alignment. The minimum distance between final inside diameter 808 and outside diameter 802 depends on the particular implementation.

Figure 9:
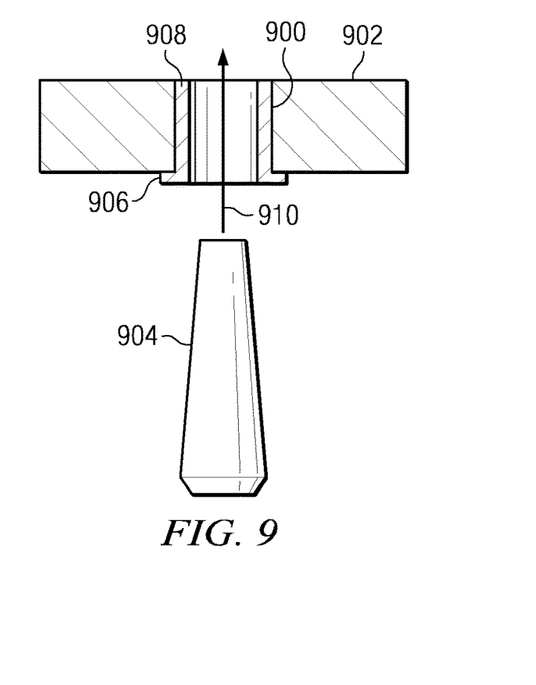
FIG. 9 is a cross-sectional diagram illustrating securing a bushing to a plate in accordance with an advantageous embodiment of the present invention.

Turning now to FIG. 9, a cross-sectional diagram illustrating securing a bushing to a plate is depicted in accordance with an advantageous embodiment of the present invention. This figure illustrates one manner in which an interference fit may be created between a bushing and the component in which the bushing is placed.

In this depicted example, bushing 900 has been placed into plate 902. Mandrel 904 is pulled from flange side 906 of bushing 900 through to non-flange side 908 of bushing 900 in the direction of arrow 910 to form an interference fit between bushing 900 and plate 902. This type of securing of bushing 900 results in stress occurring in plate 902 because bushing 900 becomes slightly deformed. In particular, the diameter on non-flange side 902 expands more than the diameter on flange side 906. As a result, reversing the direction in which mandrel 904 is pulled to the opposite side of flange side 906 results in less distortion or stresses on plate 902.

Figure 10:
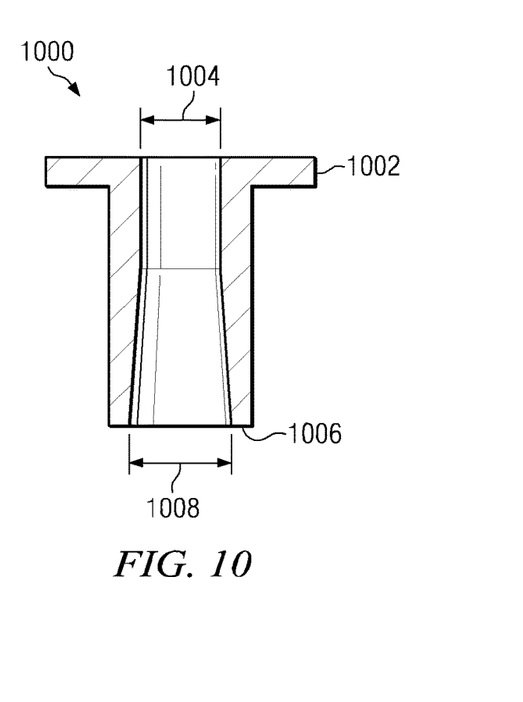
FIG. 10 is a cross-sectional diagram illustrating a bushing in accordance with an advantageous embodiment of the present invention.

Turning now to FIG. 10, a cross-sectional diagram illustrating a bushing is depicted in accordance with an advantageous embodiment of the present invention. In this example, a cross-section of bushing 1000 is depicted. Flange side 1002 of bushing 1000 has inner diameter 1004, while non-flange side 1006 has inner diameter 1008. Inner diameter 1004 is less width than inner diameter 1008. A tapering is present to increase the diameter on non-flange side 1006 within bushing 1000. This tapering is used in this illustrative example to account for a different expansion within bushing 1000 when a pull of a mandrel from flange side 1002 on non-flange side 1006 occurs in securing bushing 1000 to a plate. This geometry is selected to provide a uniform radial expansion in the bushing when an interference fit is created using a tool, such as a mandrel.

This differential expansion occurs because of the stiffness of the flange. Another reason for the differential expansion is because material from the inside diameter of bushing is pulled through the hole as the mandrel expands the bushing. This material creates more radial movement at the outside diameter and into the titanium on the exit side of the mandrel. Opening up or increasing the inside diameter of the bushing near the exit side on or increasing non-flange side 1006 creates a more uniform radial expansion. In particular a more uniform radial displacement of the outside diameter of the bushing in the metal component. The key, in these examples, is to modify the pull direction and/or bushing geometry to obtain more uniform radial or expansion displacement in the metal component in which the bushing is placed. The overall focus is the have a radial expansion in the bushing that reduces deformation or distortion in the metal component from creating the interference fit.

Further, although the pulling of a mandrel through a bushing is shown in these advantageous embodiments as a mechanism for securing a bushing to a structure in which the bushing is inserted, other methods may be used to create an interference fit depending on the particular implementation. For example, bushings may be placed into liquid nitrogen such that the bushings shrink in size. These bushings are then placed into the holes within the structures. As the bushings increase in temperature, they expand and become secured within the holes in the structures in which they have been placed.

Thus, the present invention provides a method and apparatus for preventing damage to a metal component that is susceptible to damage by electro-magnetic effects such as a lightning strike. An initial channel is formed through a metal component. A bushing is placed into the initial channel. An interference fit is created between the outer surface of the bushing and the inner surface of the initial channel in the metal component. A final channel is formed through the bushing in which material is removed from the bushing to increase a size of the inner channel. This inner channel has a size that is suitable to receive a fastener to fasten the metal component to a second component. Further, the inner surface of the metal component remains unexposed in the final channel. The bushing serves as a barrier between the fastener and the metal component within the final channel. A fastener is placed into the final channel to attach the metal component to the second component.

In these illustrative examples, the bushing acts as a sacrificial material, such that the process for placing fasteners within the titanium plate does not require drilling of the titanium itself. Instead, the drilling occurs with respect to the bushing. In these illustrative examples, the bushings are made of steel. The bushings, however, may be made of other materials depending on the particular implementation. For example, the bushing may be made of copper beryllium or aluminum nickel bronze. The particular material used for a bushing will depend on the particular implementation.

With the use of bushings in securing structures to each other with fasteners, a "One-Up Assembly" process may be implemented, such that a step in which these structures are taken apart and burrs are cleaned or removed is avoided. This extra step is avoided because any defects are generated in the bushing rather than in the structure itself. As a result, a fatigue penalty is not incurred.

A further advantage of using these bushings is that in the event of an electro-magnetic effect, such as one caused by a lightning strike, any pitting or damage occurs in the bushing, rather than in the structure in which the bushing and the fastener has been placed. As a result, any arcing between the fasteners occurs with the bushing. The titanium plates remain un-pitted and undamaged by such an electro-magnetic effect. As a result, any damage or fatigue caused by these effects may be remedied by removing the bushing and fastener and putting a new one in its place.

Further, the depicted examples in these advantageous embodiments show processes and apparatus for fastening two structural components together in an aircraft. These embodiments may be applied to any set of two or more components that are to be fastened together. For examples, the embodiments may be applied to fastening three components together in which bushing as used in two components. Additionally, although the different examples show a titanium component and a composite component being fastened together, the illustrative embodiments may be applied to any materials. Moreover, the use of the bushing as a sacrificial material may be applied to any material in which electromagnetic effects are of a concern. When electro-magnetic effects are not of a concern, a bushing also may be used as a sacrificial material with respect to reducing the number of steps needed to assemble or fasten components together. The bushing in these examples is the component that incurs defects, such as burrs, during the assembly process. The material in which the busing is inserted avoids these defects.

The description of the present invention has been presented for purposes of illustration and description, and is not intended to be exhaustive or limited to the invention in the form disclosed. Many modifications and variations will be apparent to those of ordinary skill in the art. For example, although the embodiments are directed towards components use in aircraft, the aspects of the present invention may be applied to other structures. For example, the embodiments of the present invention may be applied to automobiles or boats. In fact, the different embodiments of the present invention may be applied to fastening any two or more components together with fasteners in which damages from electro-magnetic effects is undesirable in one of more of the components. Further, different advantageous embodiments may provide different advantages as compared to other advantageous embodiments. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:
   a metal component;
   a bushing located in a channel in the metal component, wherein the bushing is secured in a hole through an interference fit;
   a second component for an aircraft, wherein the channel in the metal component extends through the second component; and
   a fastener placed into the channel to attach the metal component and the second component, wherein the bushing is configured to prevent damage from electro-magnetic effects when arcing occurs between the fastener and the bushing, whereby damage to the metal component and the second component is avoided when the apparatus is struck by lightning.

2. The apparatus of claim 1, wherein the metal component is a structural metal component comprised of titanium.

3. The apparatus of claim 1, wherein the metal component is a side-of-body chord for the aircraft and the second component is an aircraft wing.

4. The apparatus of claim 1, wherein the channel comprises an inner channel in the metal component and a final channel in the second component, wherein the inner channel has a first diameter with a first center point and wherein the final channel has a second diameter with a different center point.

5. The apparatus of claim 1, wherein the bushing is expanded relative to a first size, thereby creating the interference fit.

6. The apparatus of claim 5, wherein the bushing has the first size at a first temperature, and wherein the bushing has a second size at a second temperature, wherein the second size is greater than the first size, and wherein the second temperature is greater than the first temperature.

7. The apparatus of claim 1, wherein the fastener comprises a bolt, wherein the metal component comprises titanium, and wherein the second component comprises a carbon fiber reinforced polymer.

8. The apparatus of claim 1, wherein the bushing is a sacrificial material that suffers damage during a lightning strike in order to prevent the damage to the metal component and the second component.

9. The apparatus of claim 7, wherein the fastener comprises the bolt that is secured using a washer and a nut connected to the bolt.

10. The apparatus of claim 9, wherein the bolt extends through the channel, wherein the nut is outside a first surface of the metal component, and wherein the apparatus further comprises:
a second nut connected to the bolt and secured with a second washer, the second nut being outside a second surface of the second component.

11. The apparatus of claim 1, wherein a flange of the bushing extends out of the channel and lies flush with a surface of the metal component.

12. An apparatus comprising:
a metal component susceptible to damage caused by arcing during an electromagnetic event;
a second component, wherein a first surface of the metal component is in direct contact with a second surface of the second component;
a fastener extending through the metal component and into the second component, the fastener fastening the metal component and the second component; and
a bushing located in a channel formed in the metal component, wherein the bushing is formed of a sacrificial material, and wherein the bushing is disposed in direct contact with the metal component in the channel such that arcing between the fastener and the bushing is prevented by the sacrificial material of the bushing.

13. The apparatus of claim 12, wherein the channel also extends through the second component.

14. The apparatus of claim 12, wherein the metal component is a structural metal component comprised of titanium.

15. The apparatus of claim 12, wherein the metal component is a side-of-body chord for an aircraft and the second component is an aircraft wing.

16. The apparatus of claim 12, wherein the channel comprises an inner channel in the metal component and a final channel in the second component, wherein the inner channel has a first diameter with a first center point and wherein the final channel has a second diameter with a different center point.

17. The apparatus of claim 12, wherein the bushing is expanded relative to a first size, thereby creating an interference fit.

18. The apparatus of claim 17, wherein the bushing has the first size at a first temperature, and wherein the bushing has a second size at a second temperature, wherein the second size is greater than the first size, and wherein the second temperature is greater than the first temperature.

19. The apparatus of claim 12, wherein the fastener comprises a bolt, wherein the metal component comprises titanium, and wherein the second component comprises a carbon fiber reinforced polymer.

20. The apparatus of claim 12, wherein the bushing is the sacrificial material that suffers damage during a lightning strike in order to prevent damage to the metal component and the second component, wherein the fastener comprises a bolt that is secured using a washer and a nut connected to the bolt, wherein the bolt extends through the channel, wherein the nut is outside a third surface of the metal component opposite the first surface, wherein a flange of the bushing extends out of the channel and lies flush with a surface of the metal component, and wherein the apparatus further comprises:
a second nut connected to the bolt and secured with a second washer, the second nut being outside a fourth surface of the second component opposite the second surface.

21. An apparatus comprising:
a metal component;
a bushing located in a channel in the metal component, wherein the bushing is secured in a hole through an interference fit;
a second component for an aircraft, wherein the channel in the metal component extends through the second component; and
a fastener placed into the channel to attach the metal component and the second component, wherein the bushing is configured to prevent damage from electromagnetic effects when arcing occurs between the fastener and the bushing, whereby damage to the metal component and the second component is avoided when the apparatus is struck by lightning;
wherein:
the fastener comprises a bolt that is secured using a washer and a nut connected to the bolt;
the bolt extends through the channel; and
the nut is outside a first surface of the metal component.

* * * * *